US006769228B1

(12) United States Patent
Mahar

(10) Patent No.: US 6,769,228 B1
(45) Date of Patent: Aug. 3, 2004

(54) PRESCRIPTION ORDER PACKAGING SYSTEM AND METHOD

(75) Inventor: Michael L. Mahar, Mechanicsburg, PA (US)

(73) Assignee: Express Scripts, Inc., Maryland Heights, MO (US)

(*) Notice: Subject to any disclaimer, the term of this patent is extended or adjusted under 35 U.S.C. 154(b) by 0 days.

(21) Appl. No.: 10/205,845

(22) Filed: Jul. 26, 2002

(51) Int. Cl.[7] ............................................. B65B 57/20
(52) U.S. Cl. .................. 53/411; 53/53; 53/55; 53/502; 53/445; 53/238; 53/155; 53/505; 53/506
(58) Field of Search ...................... 53/502, 53, 411, 53/445, 238, 155, 505–506, 55

(56) References Cited

U.S. PATENT DOCUMENTS

| | | | |
|---|---|---|---|
| 5,197,261 A | * 3/1993 | Hartness et al. ............... | 53/534 |
| 5,337,919 A | * 8/1994 | Spaulding et al. ............. | 221/2 |
| 5,365,722 A | * 11/1994 | Edwards et al. ............... | 53/502 |
| 5,771,657 A | * 6/1998 | Lasher et al. .................. | 53/55 |
| 5,876,555 A | * 3/1999 | Hellsund et al. ............ | 156/540 |
| 6,098,057 A | * 8/2000 | Dlugos ....................... | 705/407 |
| 6,308,494 B1 | * 10/2001 | Yuyama et al. ............... | 53/154 |

OTHER PUBLICATIONS

Automated Prescription Systems, Inc., Automated Prescription Services—AUTOSCRIPT II (Video), Undated.
Bosch Automation Products, The TS*plus* Modular Conveyors for Flexible Manufacturing—Version 1.0, 2000.

\* cited by examiner

*Primary Examiner*—Rinaldi I. Rada
*Assistant Examiner*—Michelle Lopez
(74) *Attorney, Agent, or Firm*—Bryan Cave LLP

(57) ABSTRACT

A system for automatically packaging prescription orders composed of one or more prescription containers. The system includes a printer for generating literature associated with each order and a packer for packing the prescription containers and the associated literature into a package. The packer has a scale or other means for determining the weight of the prescription containers. A packer controller calculates package weight information based on the container weight information. The package weight information is transmitted to a mail manifest system, which generates shipping information comprising postage. A labeler applies the shipping information to the package. The packer also includes a loading mechanism for inserting the prescription containers and the literature into the package.

19 Claims, 10 Drawing Sheets

PRESCRIPTION ORDER PACKAGING SYSTEM AND METHOD

FIELD OF THE INVENTION

This invention generally relates to automated systems for dispensing and delivering prescriptions. More specifically, this invention is directed to an automatic prescription order packaging system. The system is preferably used with an automatic prescription dispensing system to automatically package prescription bottles filled by the dispensing system along with other items associated with the prescription order.

BACKGROUND OF THE INVENTION

Various systems have been developed to automatically fill large quantities of prescription bottles for use primarily in mail order pharmacies. For example, Charhut U.S. Pat. No. 5,208,762 describes an automated prescription bottle filling system. The system described in Charhut automatically fills, labels, caps, and sorts prescription bottles in accordance with prescription orders. Such automatic prescription dispensing systems can significantly reduce the time and expense required to fill a prescription, and can reduce human error inherent in conventional manual prescription filling processes.

However, a significant limitation of such automatic prescription dispensing systems is that a number of additional steps are typically required to prepare the filled prescription orders for shipping. In a conventional mail order pharmacy automatically filled prescription bottles are transported to manual packaging and mailing stations. At these stations, workers assemble the bottles associated with each prescription order and manually place the bottles into shipping packages. A literature packet printed for the order is then manually placed into the shipping package containing the bottles associated with the order. The packages containing the prescription order and associated literature packet are then sent to a manual mailing station, where each package is weighed so that postage can be determined. Postage is then manually applied to avoid damaging the contents of the filled packages.

A shortcoming of such conventional packaging and shipping processes is that they require a number of manually performed operations. These manual operations detract from the efficiency and accuracy achieved by the automated prescription filling process. For a high-volume mail order pharmacy, such manual steps increase labor costs and reduce the speed at which prescription orders are processed. Manual operations can also increase the opportunity for human error, which can result in improper packaging, labeling or shipping of the prescription order.

The automated packaging system described in Lasher et al. U.S. Pat. No. 5,771,657 is an attempt to overcome some of the deficiencies of the conventional manual packaging process. However, that system fails to completely overcome the problems inherent in manual packaging operations. For example, a significant shortcoming of the automated packaging system described in Lasher is that the packages do not leave the system ready for mailing. The packages must be sent to a separate mailing station for weighing, determining postage and labeling. This additional processing not only results in inefficiency, but also introduces opportunity for human error.

For the foregoing reasons, there is a strong need for an automatic prescription order packaging system that can quickly and accurately sort prescription bottles into orders, generate literature associated with each order, apply a shipping label and postage to shipping packages, and load the bottles of each order and associated literature into labeled packages ready for shipping. The present invention provides these and other advantageous results.

SUMMARY OF THE INVENTION

The present invention provides an integrated system and method for automatically generating literature, packaging, and preparing prescription orders for mailing.

The automatic packaging machine is an integrated system that can print literature related to the prescription order, join the associated literature and prescription containers (e.g., prescription bottles) to complete the order, place the completed order (prescriptions and literature) into a mailing package, determine shipping costs for the order, print shipping information on the order, manifest and transport the order for shipping. The printer subsystem generates literature associated with each order. The packer system receives the prescription containers composing each order and the literature associated with each order and packages the prescription containers and the literature into a package.

The packer includes a means for determining the weight of the prescription containers and transmitting container weight information. A packer controller receives the prescription container weight information and calculates package weight information based at least in part on the container weight information. A mail manifest system receives the package weight information and generates shipping information that includes postage. A labeler receives the shipping information and applies the shipping information to the package. A loading mechanism inserts the prescription containers and the literature into the package.

The system can also include a host computer having access to a database of information relating to each order. The host computer can communicate with the packer controller and the printer subsystem. The packer controller transmits data to the host computer to initiate printing of literature associated with each order.

The printer subsystem can preferably communicate with the host computer and packer controller. In one embodiment, the printer subsystem can determine document weight information relating to the weight of the literature associated with each order and transmits the document weight information to the packer controller. In another embodiment, the printer subsystem transmits to the packer controller the quantity and type of documents that have been printed as well as the quantity and type of inserts being added to the order (such as return envelopes and coupons). The packer controller determines the package weight information based at least in part on the container weight information and the document weight information. The printer subsystem can also print a machine-readable code on the literature containing information identifying the order associated with the literature. A code reader reads the code on the literature to verify that the literature is being packaged with the correct order.

Each prescription container preferably has a machine-readable code comprising identifying information for identifying the order associated with the container. In one embodiment, the packer subsystem includes an input conveyor, code reader, and container pick-and-place. The input conveyor receives the prescription containers and the code reader reads the code on the containers. Identifying information is transmitted to the packer controller. The container pick-and-place mechanism removes the prescription containers from the input conveyor and transports the containers to a scale. The packer controller controls the container pick-and-place mechanism in accordance with the identifying information.

In one embodiment, the means for determining the weight of the prescription containers includes a scale for weighing the containers. In another embodiment, the weight of the prescription containers is determined using a software program that retrieves information regarding the contents of the container from an order database and calculates the container weight based on predetermined information regarding the weight of the container and the container contents.

The labeler can apply a machine-readable code to the package containing an identifier for identifying the order associated with the package. A code reader reads the code on the package to allow verification that the prescription containers being packaged and the labeled package correspond to the same order.

The system can also include a sorter for sorting prescription containers into an order comprising one or more associated containers. The packer subsystem receives sorted containers from the sorter.

One version of the automatic packaging system includes a packer subsystem comprising a code reader for reading a machine-readable code on the prescription containers received by the packer. The code includes information for identifying the order associated with the prescription container. The automatic packaging system generates literature associated with each order from an internal, dedicated printer subsystem. Pick-and-Place mechanisms are used to marry the literature with the associated order before placing them in a shipping package. The system can also include a packer controller in communication with the code reader for receiving order identifying information from the code reader and transmitting the order identifying information and a print request. The system can also include a host computer in communication with the packer controller for receiving the order identifying information and print request from the packer controller and transmitting data associated with the order to the printer to initiate printing.

The invention also includes a method for automatically packaging prescription orders. Literature associated with each order is printed. The prescription containers and literature are packaged. The packaging step includes determining the weight of the prescription containers and literature. The package weight is calculated based at least in part on the weight of the prescription containers and the weight of the literature. Shipping information including postage is then generated. The shipping information is applied to the package and the prescription containers and the literature are inserted into the package.

BRIEF DESCRIPTION OF THE DRAWINGS

These and other features, aspects and advantages of the present invention will become more fully apparent from the following detailed description, appended claims, and accompanying drawings where:

Figure 1:
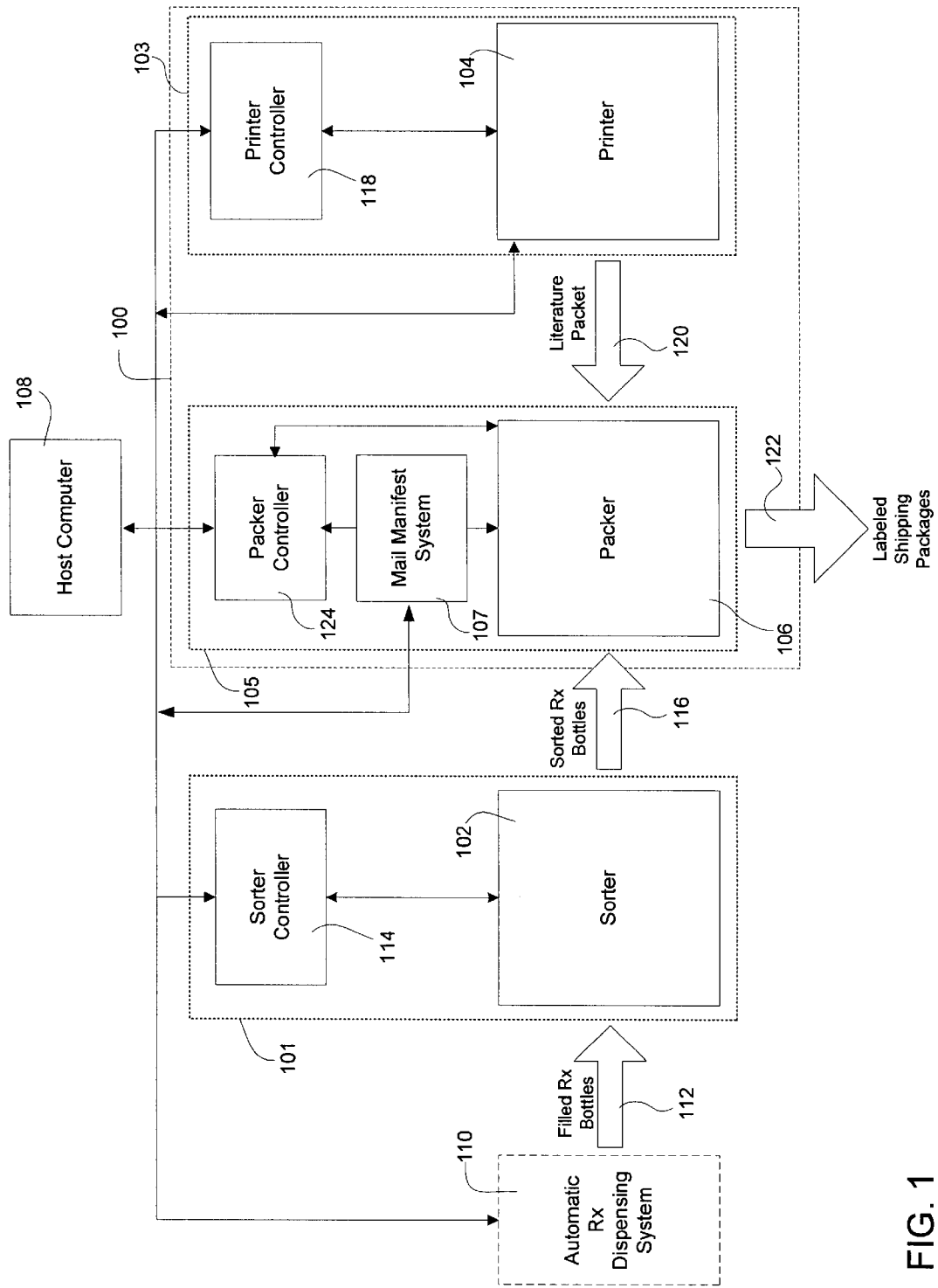
FIG. 1 is a block diagram of a system for automatically sorting and packaging prescription bottles.

For clarity, the drawing figures illustrate the general manner of construction of a preferred embodiment of the system. Descriptions and details of well-known features are omitted to avoid unnecessarily obscuring the invention. The drawings are provided for illustrative purposes only and should not be used to unduly limit the scope of the invention.

DETAILED DESCRIPTION

The automatic packaging system is preferably used with a high-volume prescription drug dispensing system to automatically package bottles filled by the dispensing system. The automatic packaging system can automatically sort filled prescription bottles into customer orders and load the bottles and associated literature in labeled packages ready for shipping.

As shown in FIG. 1, a preferred embodiment of the system includes a sorting system 101 for sorting filled prescription bottles into customer orders; an automatic packaging system 100 comprising a printer subsystem 103 for generating a unique literature packet for each order; and a packer subsystem 105 for packing the prescription bottles and associated literature into labeled packages ready for shipping to the customer.

The prescription orders are received and stored by a host computer 108, which preferably transmits data to an automatic prescription dispensing system 110, which fills the prescription bottles in accordance with each prescription order. Various automatic dispensing systems are available commercially (for example, the OPTIFILL® system manufactured by AutoMed Technologies, Inc.). The prescription bottles preferably include a label having usual prescription information along with a machine-readable code, such as a bar code, containing information concerning the prescription and/or the order. The code preferably includes a prescription number identifying the prescription. The code can also include other information relating to the prescription or order, for example, an order number, the number of bottles associated with the prescription order, etc. The description of the embodiment described herein, by way of illustrative example, is used to automatically package prescription bottles. The system can be adapted for use in packaging various other types of prescription containers including, for example, boxes, vials, bags, cans, envelopes and the like.

Filled prescription bottles are delivered to a sorter 102 via a bottle conveyor 112. Under the control of a sorter controller 114 in communication with the host computer 108, the sorter 102 sorts the bottles into customer orders. The sorted bottles are delivered to the packer 106 via a bottle conveyor 116.

The printer 104 generates literature packets customized to each order to be inserted into the shipping package for each order, on demand. Components of the printer subsystem 103 communicate with a printer controller 118 that, in turn, communicates with the host computer 108. The literature packets are transported by a literature packet transport 120 to the packer 106.

The packer subsystem 105 verifies that all bottles of the order have been properly consolidated by the sorter, determines the weight of the order, generates shipping labels that include postage, and packs the bottles and associated literature packet into a labeled shipping package. Labeled shipping packages ready for shipping are transported out of the packer 106 by package conveyor 122. A packer controller 124 controls the packer. The packer 106 is controlled by a packer controller 124, which is in communication with the host computer 108.

Host Computer

The host computer system 108 has access to an order database containing information about each order. The information in the database can include information needed to fill the prescription, to print a bottle label, to print material to accompany the order, and to ship the order. The order database also preferably includes a record of the order number associated with each order, prescription number associated with each prescription making up the order, and the number of bottles making up each prescription. The host computer can communicate with various components of the system including the automatic prescription dispensing system 110, the sorter controller 114, the packer controller 124, the mail manifest system 107, the printer controller 118, and the printer 104.

Sorter

The sorter system 101 is an optional component, which sorts prescription bottles into orders. The sorter system 101 is not required if, for example, the bottles are presorted by an automatic prescription filling system or other means. The sorter system 101 can be used with an automated prescription dispensing system that does not have a sorting function or when a separate or additional sorting is desired. The components of the sorter system 101 are controlled by a sorter controller 114, which can be any control device, for example, a programmable logic controller (PLC), personal computer or other computing device.

Figure 2:
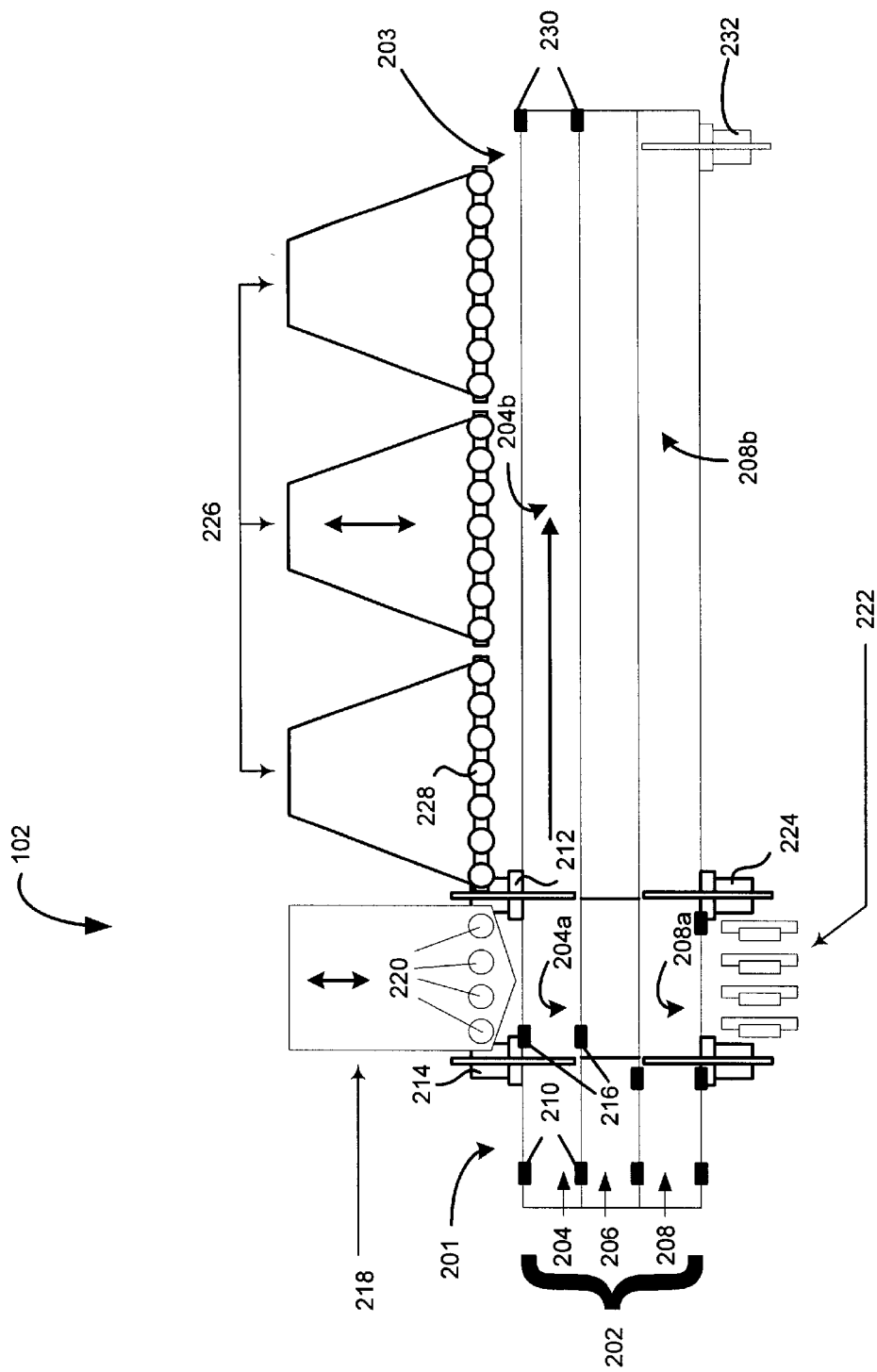
FIG. 2 schematically illustrates an apparatus for sorting prescription bottles.

In the embodiment illustrated in FIG. 2, the sorter 102 comprises a flat, belt-type conveyor 202, which transports bottles from the input of the sorter 201 to the output of the sorter 203. The conveyor 202 is divided into three conveyor lanes: an input/output lane 204, a queue lane 208, and an overflow queue lane 206. Input/output lane 204 sequentially receives the filled prescription bottles single file, preferably, from an automated prescription dispensing system 110 (see FIG. 1). A bottle tip sensor 210 sends a signal to the sorter controller 114 to stop the conveyor 202 if a bottle on the input/output lane 204 is tipped. The tip sensor is comprised of two conventional through-beam sensors located in-line, one above the other. If a bottle is standing, both sensors detect the bottle at the same time. If a bottle has fallen over, only the lower sensor detects the bottle, triggering a tipped bottle signal.

Bottles are accumulated in an input holding area 204a of input/output lane 204 by a pneumatically operated input gate 212. When input gate 212 is closed, the bottles are held in place in input holding area 204a and the belt of conveyor 202 passes underneath the stationary bottles. A stop gate 214 closes to prevent additional bottles from entering the holding area 204a and keeps pressure off the bottles in input holding area 204a.

In the illustrated embodiment, up to four bottles are accumulated in the input holding area 204a. The system is preferably configured to sort orders ranging from one to four bottles per order. Orders comprising more than four bottles are segregated for manual processing before entering the sorter. Sensor 216 sends a signal to the sorter controller 114 (FIG. 1) when four bottles have been accumulated in the holding area 204a. Alternatively, the system can be configured to handle various numbers of bottles per order.

A bottle pick-and-place ("PNP") mechanism 218 transports bottles from the input/output conveyor lane 204 to queue lane 208. As used herein the terms "pick-and-place" and "PNP" are used to refer generally to any mechanism used to transport bottles, which encompasses any of a variety of structures. Bottle PNP mechanism 218 has four pick heads 220, which preferably comprise vacuum-operated suction cups that adhere to the lids of the prescription bottles. Upon receipt of the signal from sensor 216, or a timer inside the sorter controller 114 (FIG. 1), the controller 114 signals the bottle PNP 218 to pick up bottles accumulated in the input holding area 204a. There may be one to four bottles available in holding area 204a for sorting. Once the bottles have been picked, the stop gate 214 opens, allowing the next one to four bottles to enter the input holding area 204a.

The bottle PNP 218 lifts the bottles and rotates them about their vertical axis to allow bar codes on the bottle labels to be read by four bar code readers 222. The bar code on each bottle provides a prescription number associated with the bottle. The number of bottles associated with each order can be determined by correlating the prescription number obtained from the bar code with an order number and associated data relating to the order stored in the order database accessible to the host computer system 108 (FIG. 1). The prescription number is relayed from the sorter controller 114 to the host computer 108, and the host computer 108 sends a reply back to the sorter controller 114 with the order number and order data that will determine the next action performed. Alternatively, the bar code on the bottle can include a field identifying the number of bottles in the order and other necessary information, obviating the need to communicate with a host system.

After scanning the bar codes, the bottles are placed in a queue holding area 208a of queue lane 208. Bar code information is transmitted to the sorter controller 114 (FIG. 1), which records the position of each bottle in the queue in memory. In the illustrated embodiment, bottle PNP 218 moves laterally across input/output lane 204 and places the four bottles in queue holding area 208a. Pneumatically operated queue gate 224 ensures proper flow and sequencing of the bottles entering the queue. The queue gate 224 retracts and the conveyor 202 moves the bottles from the holding area 208a into a queue portion 208b of queue lane 208. After all the bottles have moved from holding area 208a into the queue portion 208b, the gate 224 is extended closing off the exit to holding area 208a.

Once all bottles composing an order are in the queue, a queue PNP 226, under the control of the sorter controller 114 (FIG. 1), picks up the bottles associated with each order and places the bottles side-by-side on an output portion 204b of input/output conveyor lane 204 in groups corresponding to each order. In the illustrated embodiment, output lane 204b is downstream of and formed by the same conveyor belt 202 as input holding area 204a, with gate 212 separating the input from the output of input/output conveyor lane 204. Alternatively, the various lanes of the sorter can be formed using separate conveyors. The input/output conveyor lane 204 runs parallel to the queue conveyor lane 208. The queue PNP 226 has a plurality of vacuum-operated pick heads 228 that adhere to the bottle lids, to allow the queue PNP 226 to pick up one or more complete orders at a time from the queue portion 208b of queue conveyor lane 208 and place them in the output portion 204b of input/output conveyor lane 204. A sensor 230 located at the output 203 of the sorter detects when the output of the sorter is blocked and sends a signal to the sorter controller, which causes the sorter to pause temporarily.

Bottles that are not associated with complete orders or that are rejected by the host computer 108 (FIG. 1) are moved by the queue PNP 226 from the queue portion 208b of queue conveyor lane 208. When the sorter senses that the number of bottles in the queue conveyor lane 208 has reached a predetermined limit, the queue PNP 226 temporarily picks up all bottles associated with completed orders, leaving rejected bottles or bottles not associated with complete orders in the queue portion 208b of the queue conveyor lane 208. A pneumatically operated reject gate 232 at the end of the queue conveyor lane 208 retracts, opening the end of the lane 208. The queue conveyor lane 208 is activated causing all remaining bottles in the lane 208 to be discharged from the sorter off the end of lane 208. Once all bottles in the queue conveyor lane 208 have been rejected, the reject gate 232 extends, closing off the end of the conveyor lane 208. The queue PNP 226 places the bottles associated with completed orders that it had been temporarily holding back onto the queue portion 208b of queue conveyor lane 208.

In the case where power is interrupted via normal sorter shutdown, opening of an interlock, or during an emergency shutdown, the sorter controller 114 (FIG. 1) may loose data containing information about the bottles in the sorter 102. After power has been restored to the system and the sorter is placed into automatic sequencing, an initialization routine is activates checking for bottles within the system. Queue gate 224 is retracted and the conveyor 202 activated. This causes all bottles to move toward the output 232 of the sorter. All bottles in the output portion 204b of input/output conveyor lane 204 exit the sorter. After the output portion 204b is empty, the conveyor 202 stops and the queue gate 224 is extended, blocking the exit of the queue conveyor lane 208. The queue PNP 226 extends over the queue portion 208b of queue conveyor lane 208, picking up all bottles in the queue portion 208b of that lane. The queue PNP 226 then move latterly to the output portion 204b of input/output conveyor lane 204 where the bottles are released. The stop gate 212 is retracted and the conveyor 202 is actuated in a reverse direction moving bottles into the input holding area 204a of input/output lane 204. Stop gate 212 then extends and the bottle PNP 218 picks the bottles from the input holding area 204a, transporting them laterally to the bar code scanners 222. After the bar code data has been read from each bottle, the bottles are placed into the holding area 208a of queue conveyor lane 208. The bottle PNP 218 retracts over to the input holding area 204a, while both the stop gate 212 and queue gate 224 are retracted. The conveyor is activated moving the bottle(s) from the queue holding area 208a to the queue portion 208b of queue lane 208. The conveyor stops and the queue gate 224 is extended, closing off the holding area 208a. The conveyor is activated in a reverse direction moving more bottles in the output portion 204b of input/output lane 204 into the input holding area 204a. This process continues until the output portion 204b is emptied of bottles. Next, the queue PNP 226 extends latterly to the overflow lane 206. All bottles in the overflow lane 206 are picked and placed into the output portion 204b of input/output lane 204. The above process is repeated. Once all of the bar codes on the bottles have been scanned, the sorter controller 114 (FIG. 1) has record of all bottle locations. Completed orders are moved to the output portion 204b of input/output lane 204 and exit the sorter. The sorter then resumes normal operation. If the sorter found no bottles during the initialization sequence, automatic operation is resumed.

From the sorter 102, a bottle conveyor 116 moves the sorted bottles single file to the packer 106 as shown in FIG. 1.

Printer Subsystem

The printer subsystem 103 generates literature packets associated with each order to be inserted into the shipping package for each order. These literature packets are created as required for packaging. Various components of the printer subsystem are printer subsystem controller 118, which can be a circuit board control system, personal computer or other control device.

The printer subsystem 103 includes a printer 104 for printing literature associated with the order. The literature associated with each order is preferably printed once the packer 106 receives a bottle associated with the order. As discussed below, the packer can include a bar code reader for reading a bar code on the bottles as the packer receives them. The code includes information for identifying the order associated with the bottle. The printer 104 generates literature associated with each order and delivers the literature to the packer 106 once the packer has received a bottle associated with the order. The printer 104 is preferably dedicated to a single packer and is located adjacent to the packer subsystem 105 and integrated into the automatic packaging system 100. Multiple dedicated printers can be integrated into the automatic packaging system 100 for increased printing speed. An advantage of a dedicated printer adjacent to or integrated with the packer subsystem is that it allows documents to be quickly printed without the need to convey the documents from a separate printer area or to sort documents generated by one or more printers associated with multiple packers. By eliminating the need to convey and sort literature packets, the dedicated printer can generate literature packets more quickly than conventional printing systems.

Figure 3:
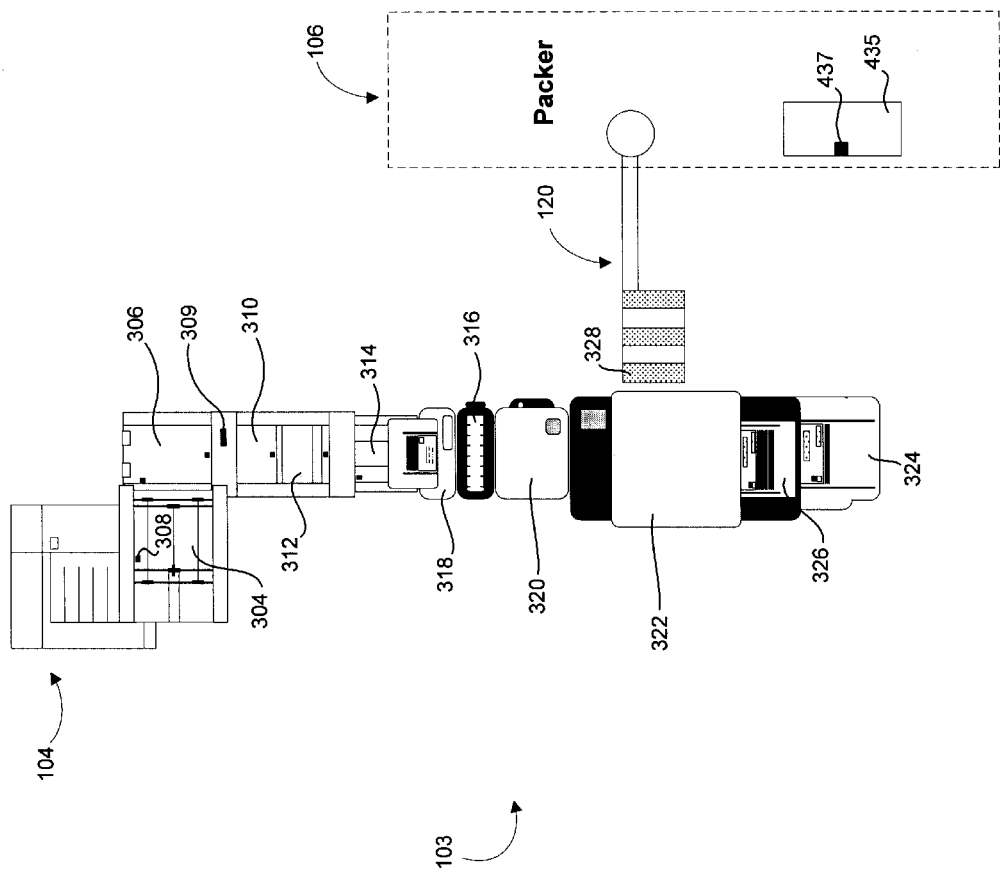
FIG. 3 schematically illustrates a printer subsystem of the automatic packaging system for generating literature associated with prescription orders.

In the embodiment illustrated in FIG. 3, the printer subsystem 103 includes a high-speed, computer-controlled printer 104 that prints literature that are uniquely tailored to each specific order. The printer 104 can communicate with a printer controller 118, which is in communication with a host computer 108 (see FIG. 1) having access to a database of information relating to each order. The printer 104 can also communicate directly with the host computer 108. A print tray transport 304 transports the individual pages of the literature packet from the printer to an accumulator 306. The printer includes a bar code scanner 308 that reads bar codes on the documents and provides initial literature packet feedback to the packer controller 124 (see FIG. 1). The bar code is also used to signal the printer subsystem when the last page of the literature packet has been reached.

The accumulator 306 collects documents related to a single order in a queue. The accumulator 306 contains a page counting sensor and document present sensor. When the literature packet is complete, the accumulator 306 sends the literature packet to the print set queue 310.

The print set queue 310 includes a bar code scanner 309, which scans a bar code printed on the literature packet and verifies order information against the printed literature packet. Upon bar code scan, data verifying that the correct number of pages was printed for the literature packet is transmitted to the packer controller 124 (FIG. 1) for use in determining the total weight of the package for manifest generation, which is described below in connection with the description of the packer.

A print purge tray 312 is used to reject any literature packets that are identified as incomplete or out of sequence. Rejected documents are diverted from the printer subsystem transport and deposited in the print purge tray 312.

A belt-drive transport 314 moves the printed portion of the literature packet to a folder 316. Remittance envelope feeder 318 inserts a remittance envelope into the literature packet. The folder 316 folds the pages of the literature packet for insertion into the collator 320. The folded pages of the literature packet and remittance envelope are passed to the collator 320. Collator 320 takes all of the components of the literature packet and organizes them for insertion. The collator 320 feeds the literature packet to an inserter 322. The inserter 322 receives the collated literature packet and can insert the complete literature packet into the selected envelope or add the selected envelope to the literature packet. The package envelope can be use by the customer to renew prescriptions or to order prescription refills. Depending upon the type of order, the system selects either a prepaid package envelope from the pre-paid envelope feeder 324 or a non-prepaid package envelope from the non-prepaid envelope feeder 326. The system selects which envelope type to use as determined by the specific order information indicated by the bar code. The selected envelope is fed into the inserter 322 and positioned for document insertion if required. The bar code on the documents can preferably be read through window of the package envelope or from the top from in the literature packet.

Figure 4:
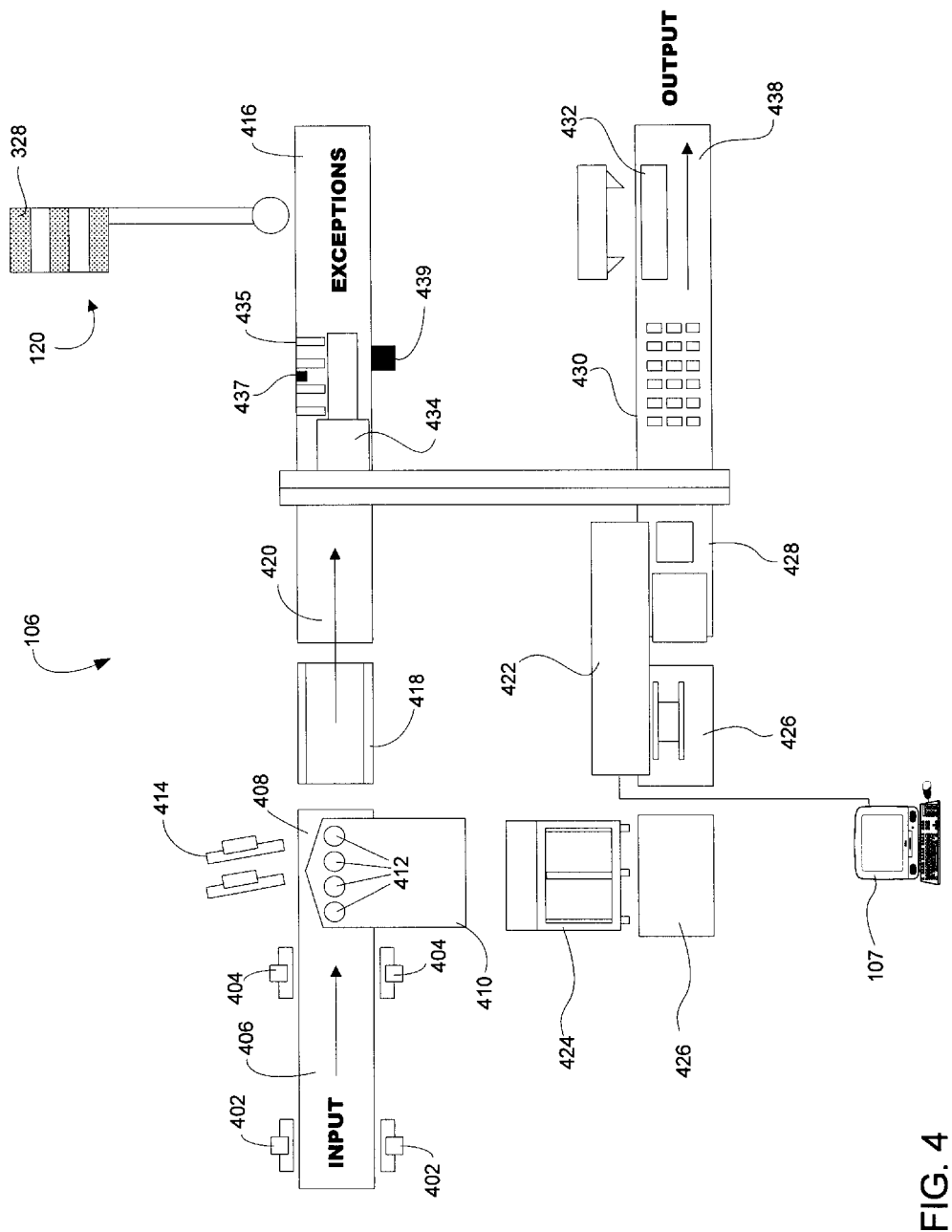
FIG. 4 schematically illustrates a packer subsystem of the automatic packaging system for packing the prescription bottles and associated literature into labeled packages.

An interposer 328 receives the complete literature packet in the order specific envelope. The literature packet transport 120, can comprise a swing arm transport mechanism for delivering the complete literature packet to the packer 106. The order specific literature packet is delivered to the literature packet pick point 435 and positioned for the packer's load PNP 434 (FIG. 4). A bar code scanner 437 at the pick point 435 verifies that the correct literature packet is provided for the order being loaded. As described in the below description of the packer, the bar code scan supports the system's s three-point validation process, which verifies that the bar code information on the literature packet, bottles, and shipping package all correspond to the same order.

Packer Subsystem

Referring now to FIGS. 1 and 4, the packer subsystem 105 verifies that all bottles of the order have been properly consolidated by the sorter, determines the weight of the bottles composing the order, generates shipping labels that include a mail manifest, and packs the bottles and associated literature packet into a labeled shipping package. A packer controller 124, which can be a PLC, personal computer or other computing device, controls the components of the packer 106.

The packer 106 receives the prescription bottles sequentially from the sorter 102 via a bottle feed conveyor 116. The packer 106 includes a bottle tip sensor 402 at the input. When activated, the tip sensor 402 sends a signal to the packer controller 124, which stops the bottle feed conveyor 116 to allow an operator to upright the bottle. A full queue sensor 404 monitors the number of bottles waiting for processing on the input conveyor 406. Should the input conveyor 406 become full, the full queue sensor 404 sends a signal to the packer controller 124, which in turn stops the bottle feed conveyor 116 to the packer until the full queue sensor 404 signals the packer controller 124 that the input conveyor 406 is no longer full.

The input conveyor 406 transports the bottles to a load station 408 where bottles are preferably accumulated in groups of four. A bottle PNP 410 at the load station 408 includes four vacuum-operated pick heads 412 that pick up the bottles by the lids. The bottle PNP 410 lifts up four bottles and positions the first two bottles in front of bar code scanners 414. The bottle PNP 410 rotates the bottles about their vertical axes to allow the bar code information to be captured by the two bar code scanners 414. Bar code data received from the scan station is transmitted to the packer controller 124. Information obtained at the scan station is used to verify order content. In a preferred embodiment, the packer controller 124 is in communication with a host computer 108. The host computer 108 uses the prescription information from the bar code scan to retrieve order information from a database accessible to the host computer 108 for verification. If a bar code cannot be read the entire order is removed from the packer 106 and passed to an exceptions conveyor 416, which discharges the bottles from the packer 106. If the order is incomplete, cancelled by the host system, or does not match the host system information, the order is rejected by the packer 106 and passed through to the exceptions conveyor 416.

Upon verification that the order is complete, the packer controller 124 issues a print command to the host computer 108. The host computer 108 generates a signal to the printer controller 118 to queue paperwork generation for a valid order. Order information is transmitted from the host computer 108 to the printer controller 118.

After bar code scan, the bottle PNP 410 places the bottles of each order onto a weigh scale 418. Once placed on the scale 418, the bottles are weighed. The total weight of bottles for each order is calculated and transmitted to the packer controller 124. Once the bottles have been weighed, they are moved from the scale 418 to a transport conveyor 420. The packer controller 124 calculates the total order weight (bottles, literature packet, shipping package). Alternatively, the packer controller can calculate the weight of the order based upon a predetermined weight of the contents without using a scale. For example, the order database accessible to the host computer can include information regarding the contents of each bottle (e.g., the type and quantity of medication contained in each bottle). A drug database can include the predetermined weight of various prescription medications. By accessing the drug database, the host computer or packer controller can calculate the weight of each bottle's contents based upon the units of medication (e.g., number of pills) dispensed and the weight per unit. The weight of the document packet can then be calculated without actually weighing the package by adding the weight of the calculated weight of the medication, bottles, literature, package, and other contents.

The packer controller 124 transmits postage information to a mail manifest system 107. As used herein, the term "mail manifest system" refers broadly to any system that is capable of generating shipping information including postage information, such as, for example, a PITNEY BOWES® ASCENT™ mail center management system, which can calculate postage and determine the means of delivery. As used herein, the term "postage" refers broadly to any indication of a charge and/or payment for shipping or mailing by the U.S. postal service or private parcel or delivery service such as, for example, FEDERAL EXPRESS® or UPS®. The packer controller 124 stores a tracking record of the postal information after recording the total weight of the order. The mail manifest system 107 transmits label information to the print-and-apply labeler 422.

The labeler 422 can print shipping labels including a bar code (including order information), postage or shipping code, shipping address and return address. The package may be any type of bag, pouch, envelope, box or package. In the illustrated embodiment, the package is a bag. The bag PNP assembly 424 uses a vacuum-operated mechanism to pickup a shipping bag from one of two bag trays 426 before placing it into a label print and apply area 428. A printed label is attached to a shipping bag positioned at a labeling station. While at the labeling station, the order number bar code is scanned to verify correctness of the order sequence. The shipping bag is then moved to the order loading station for receiving the order. As used herein the term "label" refers broadly to any shipping indicia. For example, the labeler can be configured to both print a separate adhesive label and apply it to the shipping package, or to print a shipping label (i.e., shipping information) directly on each package. Preformed shipping bags or extruded rolls of material cut to the proper length are positioned for product insertion utilizing a vacuum transfer system. The transfer system moves the bags from the label print and apply area 428, through the bag open area 430 and heat seal area 432. A bag open assembly at the bag open area 430 receives the labeled shipping bag from the transport system and positions it for order loading. The mechanism uses vacuum cups located above and below the bag to position and open the bag.

A loading mechanism such as, for example, the load PNP assembly 434 inserts the compete order into the open shipping bag. As described above, the printer subsystem 103 generates an order-unique literature, which may be inserted into a windowed envelope. Folded literature packets are sent to the load PNP 434 assembly.

The literature packet is positioned in a consistent, repeatable fashion with the bar code label positioned at the literature packet pick point 435 to allow scanning prior to document pick. Before loading of the bags, the bar codes on the prescription bottles, the literature packet and the shipping bags are read to verify the order numbers are a three-way match. A "reject or continue" decision is made at this point. The packer preferably includes a three-axis, servo-driven load PNP 434 as the mechanism for bottle and literature packet loading into a shipping bag. The load PNP 434 picks up the literature packet from the literature packet pick point 435. Bar code reader 437 scans the literature packet. The order number is read from the literature packet and sent to packer controller 124. A bottle bar code scanner 439 located at the bottle pick station scans the leading bottle of the order to be picked and sends the information to the packer controller 124 to verify the correct order is being selected. If the correct order is in place then the process continues. If the wrong order is in the queue, the packer stops, indicating a critical error. If the order is correct, the load PNP 434 then pivots and picks up the bottle(s) composing the order by using one of four vacuum-operated pick heads. While in the labeling station and after the label has been applied to the shipping bag, the bar code on the shipping label is scanned by a bar code scanner 433 to verify correctness of the order sequence. A bag opener at the bag open area 430 positions and opens the bag. If there is a three-way order number match on the literature packet, bottles, and shipping bag, the loading arm of the load PNP 434 places the literature packet and prescription bottle(s) into the opened bag together at the same time. The shipping bag and order contents are moved to a heat seal station 432. A heat-seal assembly uses a single impulse type heat element on top and an unheated compression bar on the bottom. The open end of the shipping bag is held in position while the heat-seal assembly closes the bag and seals it. The sealed bag is placed on a package conveyor 438, which transports the shipping packages from the packer 106.

System Process

Figure 5:
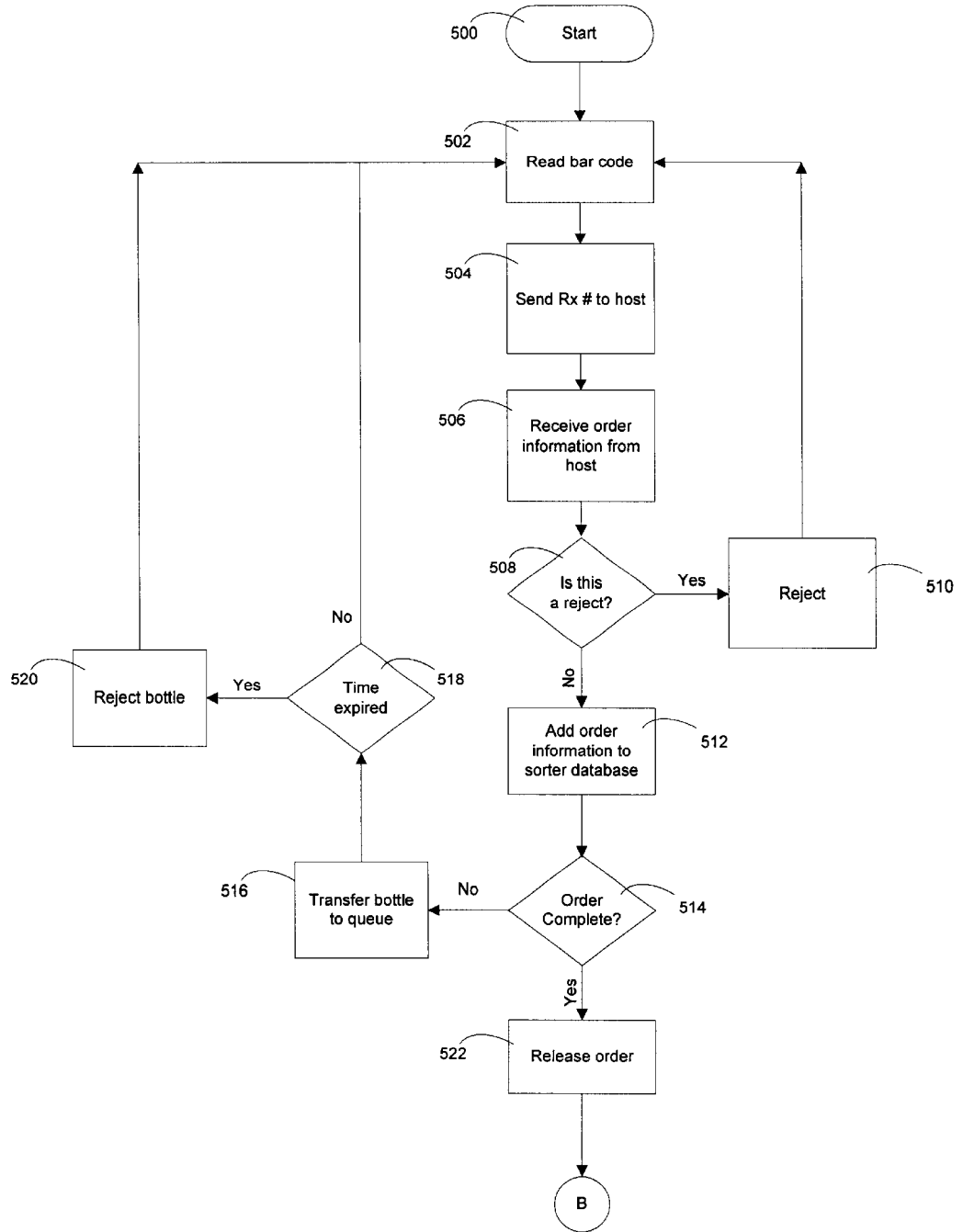
FIG. 5 is a flow chart illustrating an automatic sorting process.

FIG. 5 is a flow chart illustrating an example of a sorting process in accordance with the present invention. The process is initiated at step 500 where the prescription bottles are inducted into the sorting system. At step 502, bar code information (including prescription number) is read off of each bottle as it enters the system. At step 504, the sorter controller transmits the prescription number to the host computer and requests order information. The host computer replies at step 506, sending order information. The order information includes an order number, prescription numbers associated with the order number, number of bottles associated with each prescription number, and an order status indicator. At step 508, the controller checks the status of the order based upon the order indicator received and determines whether the order status indicates that the bottle is to be rejected. If it does, the sorter rejects the bottle at step 510 and the process returns to step 502 to read the bar code for the next bottle. If the bottle is not a reject, the process proceeds to step 512 where the sorter controller adds the order information (order number, prescription number, and number of bottles per prescription) to a sorter database. At step 514, the sorter controller searches the sorter database to determine if the bottle completes an order by determining if the other bottles have already been received an entered into the database. If the order is not complete, the system proceeds to step 516 where the sorter controller instructs the sorter to place the bottle in a queue. If the queue becomes full and the sorter does not receive a complete order within a predetermined period of time, the bottles of the rejected and partial orders are discharged from the sorter. At step 518, the sorter controller determines when the queue is full and whether a predetermined period of time has expired. If both conditions exist, the system proceeds to step 520, where the sorter controller instructs the sorter to release the bottles of the rejected and partial orders from the queue where they are discharged from the sorter. If the bottle does complete an order, the sorter controller prompts the system to release all bottles of the complete order for packing at step 522.

FIGS. 6A–6E are a series of flow charts illustrating an embodiment of an automatic packaging process according to the present invention.

Figure 6A:
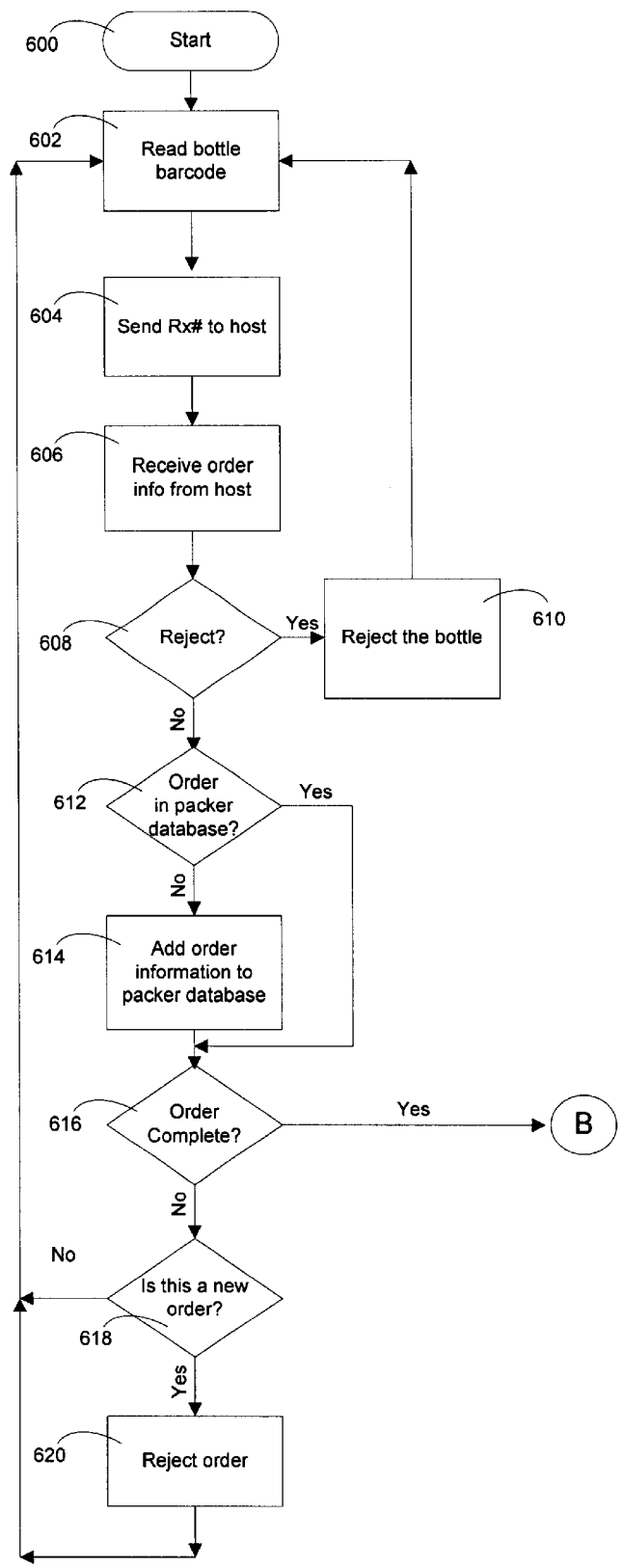
FIG. 6A is a flow chart illustrating a bottle intake portion of an automatic packaging process.

FIG. 6A illustrates an induction process for sorted bottles entering the automatic packaging system. The process commences at step 600 where the packer subsystem receives the sorted prescription bottles. The bottles have a bar code printed on the label identifying a unique prescription number. At step 602, a bar code reader reads the bar code on each bottle. At step 604, the bar code reader reads the coded prescription number and sends information to the packer controller. The packer controller is in communication with a host computer. The packer controller transmits the prescription number to the host computer and requests order information and status. At step 606, the host computer uses the prescription number to access an order database and retrieves the order number, all prescription numbers associated with the order, and the number of bottles per each prescription number and transmits this information to the packer controller along with a status of the order (approved or rejected). At step 608, the packer controller checks the status of the order based upon the information received from the host computer to determine whether the order is approved or rejected. If the order is rejected, the packer rejects the bottle from the system at step 610 and the process returns to step 602 and the next bottle is processed. If the order is approved, the process proceeds to step 612 and the packer controller accesses a packer database to determine if the order number is already in the database. If the order is not in the database, the packer controller adds the order information to the database (order number, prescription numbers, and number of bottles associated with each prescription number) at step 614. Once the order has been added or if the order was determined to be in the database, the process proceeds to step 616 where the packer controller checks the information in the packer database to determine if the bottle completes an order. If the order is not complete, the process returns to step 602 and the induction process is repeated for the next bottle. At step 618, the system determines whether the bottle is part of a different order than the previous bottle received by the packer. If the bottle is part of a new order, the bottles of the previous incomplete order are rejected at step 620 and discharged from the packer. If the bottle is not part of a new order, the process proceeds to step 602 and the bar code on the next bottle entering the packer is scanned. If the order is complete, the packer controller initiates a document print request as illustrated in FIG. 6B.

Figure 6B:
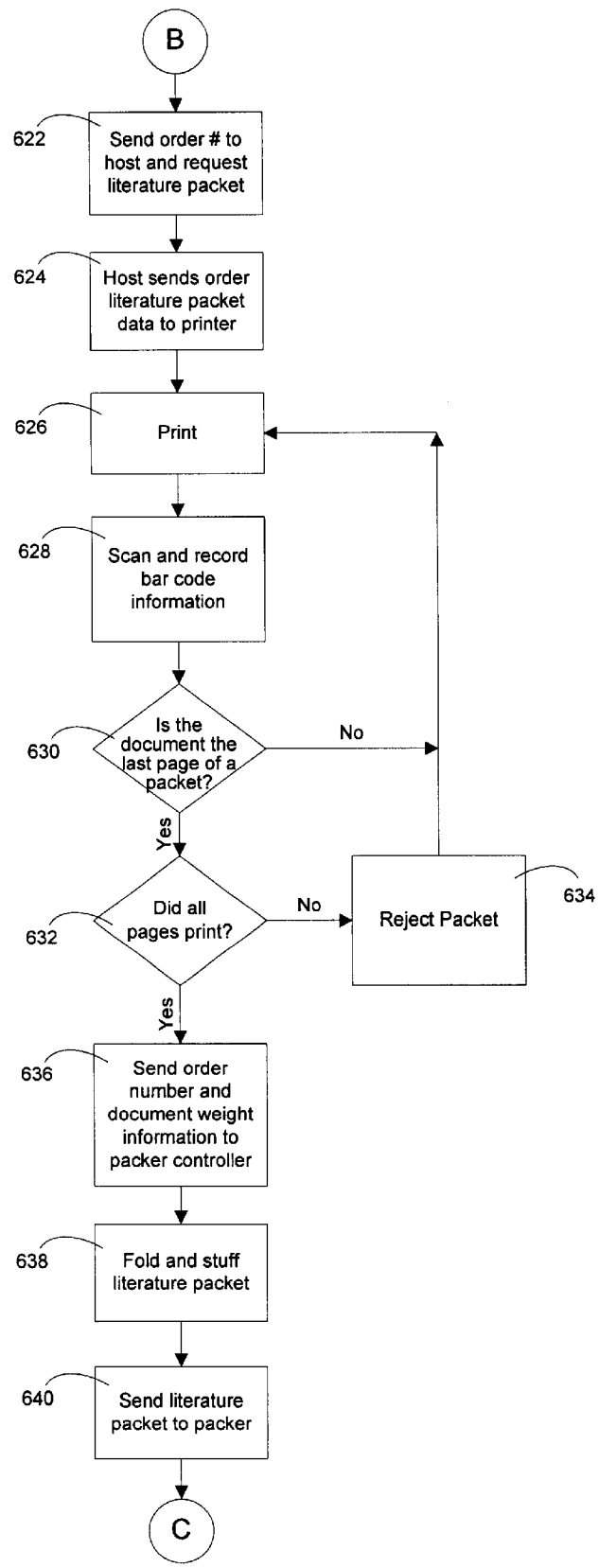
FIG. 6B is a flow chart illustrating a document printing portion of an automatic packaging process.

FIG. 6B illustrates a document printing process. Once the packer controller determines that a complete order has been received by the packer, the packer controller initiates the printing process at step 622 by sending the order number to the host computer and requesting a an order-specific literature packet. The host computer responds at step 624 and sends the order literature packet data to the printer subsystem. At step 626, literature packets are printed, marking each page with a bar code, indicating the order number, type of remittance envelope, and the number of pages in the packet. At step 628, the literature for the packet are accumulated as a bar code reader scans the bar code information on each page and transmits the bar code information to the printer controller. The printer controller records the bar code information (including order number, type of remittance envelope, and the number of pages in the packet) in memory. At step 630, the printer controller determines whether a scanned page is the last page of the literature packet. This determination can be made by placing an "end-of-set" code on the last page of each literature pack that indicates the end of a literature pack and an "start set" code on the first page of each literature pack. In this manner, a complete packet is indicated when the bar code scanner reads a "start set" code and a corresponding "end set" code. If the document is not part of a new packet, the process returns to step 626 where other documents of the literature packet are printed. Once the literature packet is complete, the process proceeds to step 632 where the printer controller determines if all pages of the packet printed. This step can be accomplished by determining if a "start set" code was followed by a corresponding "end set" code. Alternatively, or as a backup, each bar code can include information indicating a page sequence and the total number of pages associated with the packet. If all pages did not print, the literature packet is rejected and discharged from the printer at step 634, and the process returns to step 626 where the documents are reprinted. If the literature packet is complete and all pages of the packet printed, the process proceeds to step 636 where the printer controller sends the order number and document weight information to the packer controller. The literature weight information is data for determining the weight of the literature packet. The literature weight information can be the actual weight of the literature packet or parts thereof, or can be information for calculating the weight, such as, the number of pages and number of envelopes used in the order. The process then proceeds to step 638 where the literature packet is folded and a remittance envelope may be added to the packet. A return envelope is selected and the folded document packet is inserted into the selected return envelope with a bar code indicating the order number showing through the window of the envelope. The completed literature packet is then passed to the packer 106 at step 640.

Figure 6C:
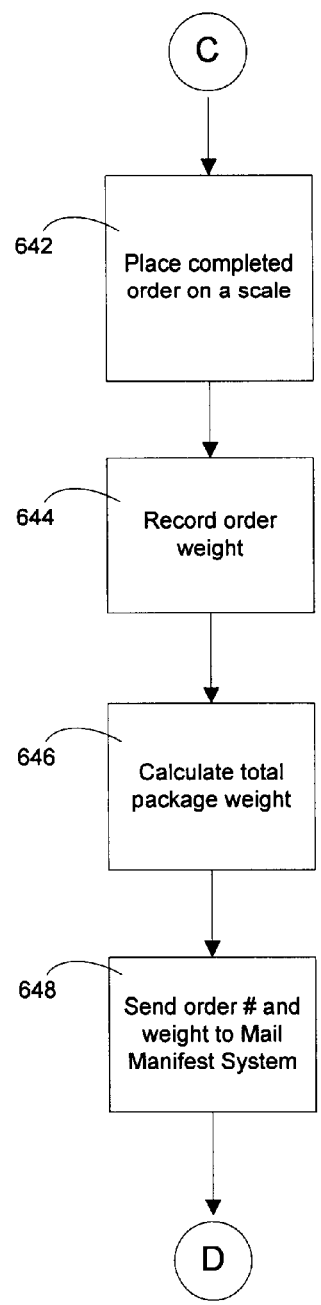
FIG. 6C is a flow chart illustrating a package weight determination portion of an automatic packaging process.

FIG. 6C is a flow chart illustrating a package weight determination process. The process commences at step 642 where the packer places all bottles of the complete order on a scale. As discussed above, the weight of the bottles can also be calculated without a scale by retrieving information regarding the contents of each bottle from an order database and retrieving information regarding the weight of various prescription drugs from a drug database. Once the weight of the bottles of the order is determined, the packer controller at step 644 records the weight of the bottles composing each order. At step 646, the packer controller receives the literature weight information from the printer controller and calculates the weight of the literature packet. The total weight of the order-specific literature packet is calculated based upon the number and types of documents, envelopes and other materials associated with the specific order, which may vary from order to order. The packer controller then adds the bottle weight to the calculated literature packet weight and weight of the bag or other packaging material to determine the total package weight. At step 648, the packer controller sends the order number and package weight to the mail manifest system.

Figure 6D:
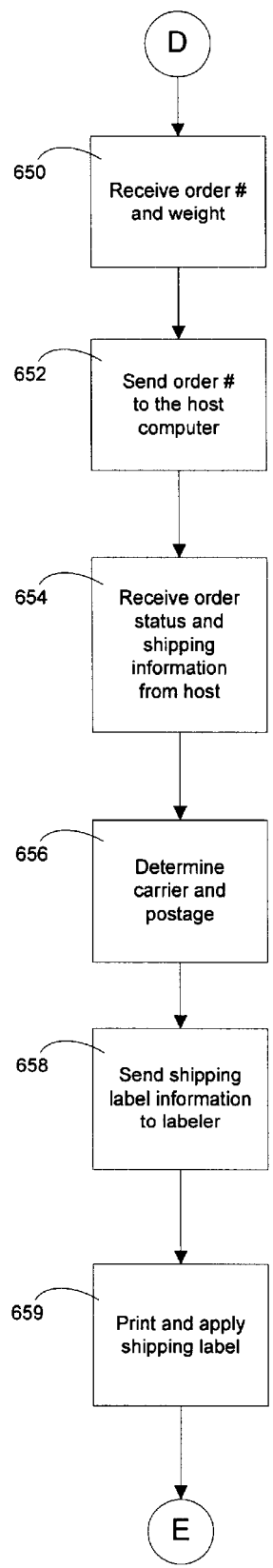
FIG. 6D is a flow chart illustrating a mail manifest portion of an automatic packaging process.

FIG. 6D illustrates the functions performed by the mail manifest system. At step 650, the mail manifest system receives the order number and package weight from the packer controller. The mail manifest system sends the order number to the host computer at step 652. At illustrated at 654, the host computer returns order status and shipping information (including name, address and any special shipping instructions) to the mail manifest system. From the information received from the host computer, the mail manifest system determines the appropriate carrier and postage, at step 656. The process proceeds to step 658 where the mail manifest system sends the shipping label information to the print-and-apply label printer. At step 659, the label printer prints the shipping information, including postage, carrier bar codes if required, and a bar code containing the order number, onto a shipping label and applies it to a shipping bag. As noted above, the label can be a separate label that is adhered to the bag or, alternatively, it can be printed directly on the bag, depending upon the type of labeler and shipping container selected.

Figure 6E:
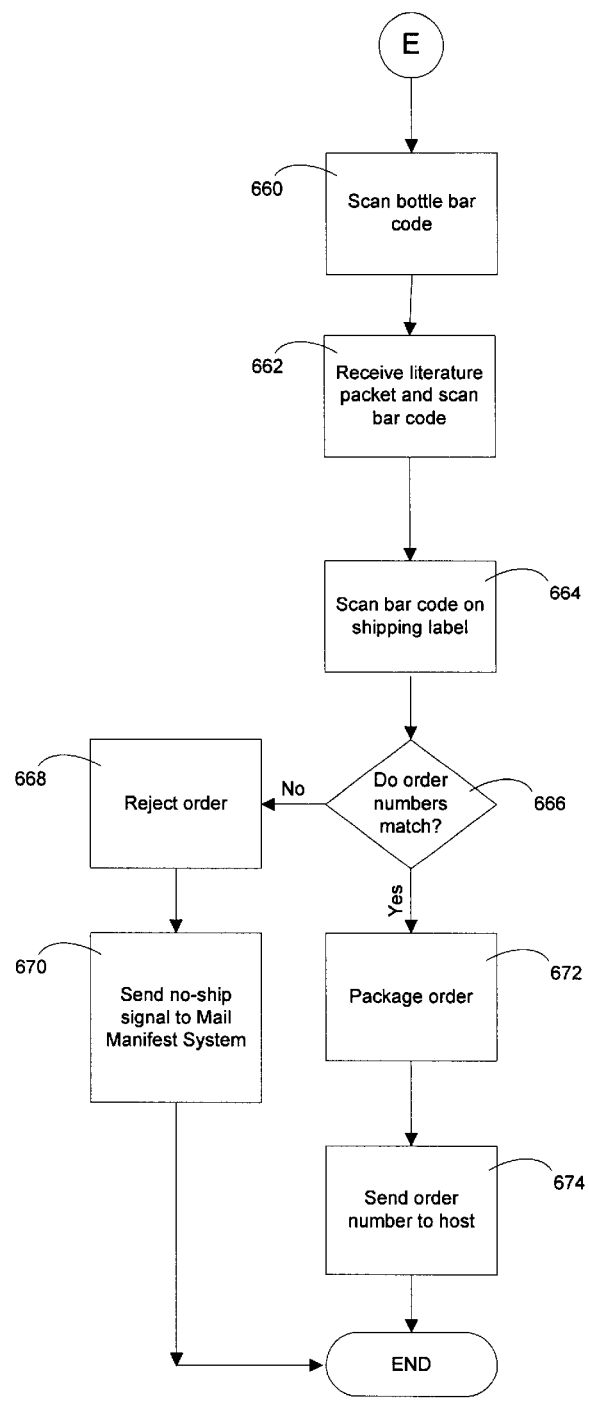
FIG. 6E is a flow chart illustrating a packaging portion of an automatic packaging process.

FIG. 6E is a flow chart illustrating the final verification and packaging process. At step 660, the bottles composing the order are transferred from the scale to the loading mechanism where a final bar code scan is made and the packer controller records the order number. At step 662, the literature packet is received from the printer subsystem where the bar code on the literature packet is scanned and the packer controller records the order number. At step 664, the bar code on the shipping label is scanned and the packer controller records the order number. At step 666, the packer controller compares the order number from the bottles with the order number from the literature packet and shipping label to ensure that there is a three-way match. If the order numbers do not match, the literature packet, bottles and bag are rejected at step 668 and discharged from the packer. At step 670, the packer controller sends the order number to the mail manifest system indicating that the order was not shipped. If at step 666 it is determined that the order numbers match, the process proceeds to step 672 and the bottle and literature packet are placed into the shipping bag and the bag is sealed. At step 674, the packer controller sends the order number to the host computer indicating that the order has been shipped.

As will be appreciated by those skilled in the art, a significant advantage of the automatic packaging system over prior systems is that the package exists the system ready for shipping. Unlike conventional systems, the package does not need to be sent to a mailing station for further processing. The innovative system of the present invention eliminates the need for further manual packaging, weighing, labeling or sorting of the package for shipping. A final three-point validation step verifies matching bar codes on the sipping container, order contents, and documentation packaged. Thus, the system provides the significant advantage of reducing the cost of packaging by eliminating additional steps and labor associated therewith. The system also eliminates the risk of human error in mislabeling the package and the possibility of sending the wrong literature, medicine, or package to a customer.

Although the invention has been described with reference to a specific embodiment, it will be understood by those skilled in the art that various changes may be made without departing from the spirit or scope of the invention. For instance, the numerous details set forth herein relating to the configuration and operation of the presently preferred embodiment of the conveyor systems, PNP mechanisms, and control system components are provided to facilitate an understanding of the invention and are not provided to limit the scope of the invention. Accordingly, the disclosure of a preferred embodiment of the invention is intended to be illustrative of the scope of the invention and is not intended to be limiting. It is intended that the scope of the invention shall be limited only to the extent required by the appended claims.

I claim:

1. A system for automatically packaging prescription orders, each order comprising one or more prescription containers, the system comprising:
   (a) a printer subsystem for generating literature associated with each order, determining document weight information relating to the weight of the literature associated with each order, and transmitting the document weight information; and
   (b) a packer subsystem for receiving prescription containers composing each order and the literature associated with each order and packing the prescription containers and the literature into a package, the packer subsystem comprising:
      (i) a means for determining the weight of the prescription containers and transmitting container weight information;
      (ii) a packer controller in communication with the means for determining the weight of the prescription containers and the printer subsystem, the packer controller receiving the container weight information from the means for determining the weight of the prescription containers and receiving the document weight information from the printer subsystem, the packer controller calculating package weight information based at least in part on the container weight information and the document weight information;
      (iii) a mail manifest system in communication with the packer controller, the mail manifest system receiving the package weight information and generating shipping information comprising postage;
      (iv) a labeler in communication with the mail manifest system, the labeler receiving the shipping information and applying the shipping information to the package; and
      (v) a loading mechanism for inserting the prescription containers and the literature into the package.

2. The system of claim 1, wherein the means for determining the weight of the prescription containers comprises a scale for weighing the prescription containers.

3. The system of claim 1, wherein the system further comprises an order database comprising information regarding the contents of each prescription container and wherein the means for determining the weight of the prescription containers comprises a software program for retrieving the information regarding the contents of the containers and calculating the prescription container weight based on predetermined information regarding the weight of the container and the container contents.

4. The system of claim 1, wherein each prescription container has a machine-readable code comprising information for identifying the order associated with the prescription container, and wherein the packer subsystem further comprises:
   (a) an input conveyor for receiving the prescription containers;
   (b) a code reader for reading the code on the prescription containers and transmitting the identifying information to the packer controller; and
   (c) a container pick-and-place mechanism for removing the prescription containers from the input conveyor and transporting the prescription containers to the scale, wherein the packer controller controls the container pick-and-place mechanism in accordance with the identifying information.

5. The system of claim 4, further comprising a container tip sensor for stopping the input conveyor of the packer subsystem if a tipped prescription container is detected.

6. The system of claim 4, further comprising a queue full sensor for stopping the input conveyor to the packer subsystem if a full queue is detected.

7. The system of claim 4, wherein the container pick-and-place mechanism comprises one or more vacuum operated pick heads for picking up one or more prescription containers.

8. The system of claim wherein claim 7, the container pick-and-place mechanism rotates the prescription containers to allow the code reader to read the code on each prescription container.

9. The system of claim 4, further comprising a host computer in communication with the packer controller and the printer subsystem, and wherein the packer controller communicates data to the host computer to initiate printing of literature associated with each order.

10. The system of claim 4, wherein the labeler applies a machine-readable code to the package containing an identifier for identifying the order associated with the package.

11. The system of claim 10, wherein the packer subsystem further comprises a code reader for reading the code on the package to allow verification that the prescription containers being packaged and the labeled package correspond to the same order.

12. The system of claim 4, wherein the package is a bag and wherein the packer subsystem further comprises a bag pick-and-place mechanism for transporting the bag for labeling and loading.

13. The system of claim 1, wherein the loading mechanism comprises a document picking member for picking up literature corresponding to the order and a container pick-and-place having one or more vacuum operated pick heads for picking up one or more prescription containers.

14. The system of claim 1, wherein the printer subsystem is in communication with a host computer having access to a database of information relating to each order.

15. The system of claim 1, wherein the printer subsystem prints a machine-readable code on the literature containing information identifying the order associated with the literature.

16. The system of claim 15, wherein the printer subsystem includes a code reader for reading the code on the literature to allow verification that the literature is being packaged with the correct order.

17. The system of claim 1, further comprising a sorter for sorting prescription containers into an order comprising one or more associated prescription containers, wherein the packer subsystem receives sorted prescription containers from the sorter.

18. A system for automatically packaging prescription orders, each order comprising one or more prescription bottles, wherein each bottle has a machine-readable code thereon containing coded information comprising a prescription identifier associated with one of the orders, the system comprising:

(a) a host computer having access to a database comprising a plurality of order identifiers, each order identifier being associated with order information for one of the orders, the order information comprising an identification of the shipping name and address and one or more associated prescription identifiers identifying one or more prescriptions;

(b) a sorter for sorting prescription bottles into orders;

(c) a printer subsystem for generating literature associated with each order, the printer subsystem comprising a print controller in communication with the host computer, wherein the printer controller generates weight information relating to the weight of literature associated with each order; and (d) a packer subsystem for receiving bottles composing each order and the literature associated with each order and packing the bottles and the literature into a package, the packer subsystem comprising:

(i) a code reader for reading the machine-readable code on each bottle;

(ii) a scale for weighing the bottles and transmitting bottle weight information;

(iii) a packer controller in communication with the code reader, scale host computer, and print controller, wherein the packer controller:

a. receives the coded information from the code reader and transmits the prescription identifier to the host computer; and b. receives the bottle weight information from the scale and document weight information from the printer controller and calculates package weight information based at least in part on the bottle weight information and document weight information;

(iv) a mail manifest system in communication with the packer controller and the host computer, the mail manifest system receiving the package weight information and at least a portion of the order information and generating shipping information comprising postage;

(v) a labeler in communication with the mail manifest system, the labeler receiving the shipping information and applying the shipping information to the package; and (vi) a loading mechanism for inserting the bottles and the literature into the package; and wherein the host computer prompts the printer subsystem to print literature associated with an order once one or more of the bottles associated with the order have been received by the packer.

19. A system for automatically packaging prescription orders, each order comprising one or more prescription containers, the system comprising:

(a) a printer subsystem for generating literature associated with each order, the printer subsystem comprising a printer controller for transmitting data relating to the weight of the literature; and (b) a packer subsystem for receiving prescription containers composing each order and the literature associated with each order and packing the prescription containers and the literature into a package, the packer subsystem comprising:

(i) a means for determining the weight of the prescription containers and transmitting container weight information;

(ii) a packer controller in communication with the means for determining the weight of the prescription containers and the printer controller, the packer controller receiving the container weight information and data relating to the weight of the literature and calculating package weight information based at least in part on the container weight information;

(iii) a mail manifest system in communication with the packer controller, the mail manifest system receiving the package weight information and generating shipping information comprising postage;

(iv) a labeler in communication with the mail manifest system, the labeler receiving the shipping information and applying the shipping information to the package; and (v) a loading mechanism for inserting the prescription containers and the literature into the package.

* * * * *

UNITED STATES PATENT AND TRADEMARK OFFICE
CERTIFICATE OF CORRECTION

PATENT NO.         : 6,769,228 B1                                    Page 1 of 2
APPLICATION NO. : 10/205845
DATED              : August 3, 2004
INVENTOR(S)        : Michael L. Mahar It is certified that error appears in the above-identified patent and that said Letters Patent is hereby corrected as shown below:

Under the "U.S. PATENT DOCUMENTS" subsection of the "References Cited" section that is shown on the face of the above patent, the following U.S. patent documents and related information should be added thereto:

| | | | |
|---|---|---|---|
| 4,664,289 | 5/12/1987 | Shimizu et al. | 221/2 |
| 4,672,553 | 6/09/1987 | Goldberg | 364/478 |
| 4,918,604 | 4/17/1990 | Baum | 364/413.01 |
| 4,972,657 | 11/27/1990 | McKee | 53/411 |
| 5,097,652 | 3/24/1992 | Inamura et al. | 53/493 |
| 5,208,762 | 05/04/1993 | Charhut et al. | 364/478 |
| 5,348,061 | 10/12/1999 | Riley et al. | 141/104 |
| 5,463,839 | 11/07/1995 | Stange et al. | 53/54 |
| 5,463,840 | 11/07/1995 | Bailer | 53/117 |
| 5,522,512 | 06/04/1996 | Archer et al. | 209/580 |
| 5,597,995 | 1/28/1997 | Williams et al. | 235/375 |
| 5,638,657 | 6/17/1997 | Archer et al. | 53/253 |
| 5,660,305 | 8/26/1997 | Lasher et al. | 221/206 |
| 5,667,096 | 9/16/1997 | Wu | 221/6 |
| 5,709,063 | 1/20/1998 | Yuyama et al. | 53/154 |
| 5/713,180 | 2/03/1998 | Lewis | 53/253 |
| 5,713,485 | 2/03/1998 | Liff et al. | 221/2 |
| 5,720,154 | 2/224/1998 | Lasher et al. | 53/411 |
| 5,752,368 | 5/19/1998 | Tobe | 53/501 |
| 5,762,116 | 6/09/1998 | Moore | 141/145 |
| 5,765,606 | 6/16/1998 | Takemasa et al. | 141/104 |
| 5,787,678 | 8/04/1998 | Koike et al. | 53/154 |
| 5,797,515 | 8/25/1998 | Life et al. | 221/2 |
| 5,810,061 | 9/22/1998 | Yuyama | 141/129 |
| 5,812,410 | 9/22/1998 | Lion et al. | 364/479 |
| 5,829,231 | 11/03/1998 | Harding et al. | 53/493 |
| 5,839,257 | 11/24/1998 | Soderstrom et al. | 53/411 |
| 5,852,911 | 12/29/1998 | Yoyama et al. | 53/168 |
| 5,875,610 | 3/02/1999 | Yuyama et al. | 53/75 |
| 5,883,370 | 3/16/1999 | Walker et al. | 235/375 |
| 5,884,806 | 3/23/1999 | Boyer et al. | 221/75 |
| 5,907,493 | 5/25/1999 | Boyer et al. | 364/479.01 |
| 5,946,883 | 09/07/1999 | Yuyama et al. | 53/154 |
| 5,963,453 | 10/10/1999 | East | 364/479.14 |
| 5,988,858 | 11/23/1999 | Yuyama et al. | 364/478.18 |

UNITED STATES PATENT AND TRADEMARK OFFICE
CERTIFICATE OF CORRECTION

PATENT NO. : 6,769,228 B1  
APPLICATION NO. : 10/205845  
DATED : August 3, 2004  
INVENTOR(S) : Michael L. Mahar It is certified that error appears in the above-identified patent and that said Letters Patent is hereby corrected as shown below:

| | | | |
|---|---|---|---|
| 6,006,946 | 12/128/1999 | Williams et al. | 221/9 |
| 6,014,631 | 1/11/2000 | Teagarden et al. | 705/3 |
| 6,035,905 | 3/14/2000 | Griffin | 141/181 |
| 6,036,812 | 3/14/2000 | Williams et al. | 156/277 |
| 6,119,737 | 9/19/2000 | Yuyama et al. | 141/104 |
| 6,145,700 | 11/14/2000 | Takahashi et al. | 221/133 |
| 6,155,485 | 12/05/2000 | Coughlin et al. | 235/383 |
| 6,167,679 | 1/02/2001 | Horton-Steidle et al. | 53/411 |
| 6,170,230 | 1/09/2001 | Chudy et al. | 53/168 |
| 6,176,392 | 1/23/2001 | Williams et al. | 221/109 |
| 6,181,982 | 1/30/2001 | Yuyama et al. | 700/236 |
| 6,185,479 | 2/06/2001 | Cirrone et al. | 700/216 |
| 6,202,385 | 3/20/2001 | Kim | 53/154 |
| 6,202,923 | 3/20/2001 | Boyer et al. | 235/375 |
| 6,208,911 | 3/27/2001 | Yamaoka et al. | 700/242 |
| 6,216,418 | 4/17/2001 | Kim | 53/131.5 |
| 6,219,587 | 4/17/2001 | Ahlin et al. | 700/233 |
| 6,256,967 | 7/10/2001 | Hebron et al. | 53/501 |

Non-Patent References:

Automated Prescription Systems, Inc.; The Baker Autoscript II System undated  
Automated Prescription Systems, Inc., Automated Prescription Services - Autoscript II (video) undated  
Automated Prescription Systems, Inc.; Baker Autoscript II – July 1991

Signed and Sealed this

Fourth Day of March, 2008

JON W. DUDAS  
*Director of the United States Patent and Trademark Office*